United States Patent US 10,627,585 B2
Kadar-Kallen et al. Apr. 21, 2020

(54) RECESSED LATCHING SYSTEM FOR AN OPTICAL CONNECTOR AND ADAPTER

(71) Applicant: COMMSCOPE TECHNOLOGIES LLC, Hickory, NC (US)

(72) Inventors: Michael Aaron Kadar-Kallen, Harrisburg, PA (US); Robert Charles Flaig, Lancaster, PA (US); Danny Willy August Verheyden, Gelrode (BE)

(73) Assignee: COMMSCOPE TECHNOLOGIES LLC, Hickory, NC (US)

(*) Notice: Subject to any disclaimer, the term of this patent is extended or adjusted under 35 U.S.C. 154(b) by 0 days.

(21) Appl. No.: 15/770,126

(22) PCT Filed: Oct. 19, 2016

(86) PCT No.: PCT/US2016/057717
§ 371 (c)(1),
(2) Date: Apr. 20, 2018

(87) PCT Pub. No.: WO2017/070220
PCT Pub. Date: Apr. 27, 2017

(65) Prior Publication Data
US 2018/0284362 A1 Oct. 4, 2018

Related U.S. Application Data

(60) Provisional application No. 62/245,111, filed on Oct. 22, 2015.

(51) Int. Cl.
*G02B 6/38* (2006.01)

(52) U.S. Cl.
CPC ........ *G02B 6/3893* (2013.01); *G02B 6/3825* (2013.01); *G02B 6/3849* (2013.01); *G02B 6/3873* (2013.01)

(58) Field of Classification Search
CPC .. G02B 6/3893; G02B 6/3873; G02B 6/3849; G02B 6/3825; G02B 6/44
See application file for complete search history.

(56) References Cited

U.S. PATENT DOCUMENTS 6,019,521 A 2/2000 Manning et al.
6,142,676 A 11/2000 Lu
(Continued)

FOREIGN PATENT DOCUMENTS

JP 2014-186274 A 10/2014
WO 2012/112344 A1 8/2012
(Continued)

OTHER PUBLICATIONS

International Search Report and Written Opinion of the International Searching Authority for International Patent Application No. PCT/US2016/057717 dated Dec. 19, 2016, 12 pages.

(Continued)

*Primary Examiner* — Andrew Jordan
(74) *Attorney, Agent, or Firm* — Merchant & Gould P.C.

(57) ABSTRACT

A fiber optic adapter includes an adapter body defining a port leading to an alignment structure. The optical adapter also defines a platform disposed at the first port. The platform is recessed inwardly from an outer periphery of the adapter body. The platform includes latching members having catch surfaces. A fiber optic connector includes a connector plug body holding an optical fiber. The connector also includes a latching arm having a latching end that defines two rearwardly facing catch surfaces separated by a central webbing, which extends along a length of the latching arm. The rearwardly facing catch surfaces align with the catch surfaces of the latching members when the fiber optic connector is received at the fiber optic adapter.

21 Claims, 13 Drawing Sheets

(56) References Cited

U.S. PATENT DOCUMENTS

| | | | |
|---|---|---|---|
| 6,224,268 B1 | 5/2001 | Manning et al. | |
| 8,917,967 B2 | 12/2014 | Kempeneers et al. | |
| 9,268,102 B2* | 2/2016 | Daems | G02B 6/3809 |
| 9,481,129 B2* | 11/2016 | Verheyden | G02B 6/3833 |
| 9,575,263 B2 | 2/2017 | Gurreri et al. | |
| 9,625,660 B2* | 4/2017 | Daems | G02B 6/3809 |
| 9,638,869 B2* | 5/2017 | Nhep | G02B 6/3869 |
| 9,798,091 B2* | 10/2017 | Samal | G02B 6/3809 |
| 9,885,839 B2* | 2/2018 | Watte | G02B 6/3866 |
| 10,036,859 B2* | 7/2018 | Daems | G02B 6/3809 |
| 10,114,178 B2* | 10/2018 | Verheyden | G02B 6/3833 |
| 10,444,441 B1* | 10/2019 | Ho | G02B 6/387 |
| 2002/0191919 A1 | 12/2002 | Nolan | |
| 2008/0247710 A1 | 10/2008 | Oike et al. | |
| 2013/0028569 A1 | 1/2013 | Kempeneers et al. | |
| 2014/0124140 A1* | 5/2014 | Verheyden | G02B 6/3833 156/350 |
| 2014/0341511 A1* | 11/2014 | Daems | G02B 6/3809 385/77 |
| 2015/0362681 A1* | 12/2015 | Watte | G02B 6/3866 385/58 |
| 2015/0378109 A1* | 12/2015 | Samal | G02B 6/3809 385/58 |
| 2016/0018604 A1 | 1/2016 | Gurreri et al. | |
| 2016/0259134 A1* | 9/2016 | Daems | G02B 6/3809 |
| 2017/0123166 A1* | 5/2017 | Gurreri | G02B 6/3809 |
| 2017/0146749 A1* | 5/2017 | Verheyden | G02B 6/3833 |
| 2017/0285279 A1* | 10/2017 | Daems | G02B 6/3809 |
| 2018/0045899 A1* | 2/2018 | Watte | G02B 6/3866 |
| 2018/0120515 A1* | 5/2018 | Samal | G02B 6/3809 |
| 2018/0284362 A1* | 10/2018 | Kadar-Kallen | G02B 6/44 |
| 2018/0341071 A1* | 11/2018 | Gurreri | G02B 6/3809 |
| 2019/0310432 A1* | 10/2019 | Chang | G02B 6/3898 |

FOREIGN PATENT DOCUMENTS

| | | |
|---|---|---|
| WO | 2013/117589 A2 | 8/2013 |
| WO | 2013/117598 A2 | 8/2013 |
| WO | 2014/118224 A1 | 8/2014 |
| WO | 2014/118225 A1 | 8/2014 |

OTHER PUBLICATIONS

Extended European Search Report for corresponding European Patent Application No. 16858138.7 dated May 24, 2019, 7 pages.

* cited by examiner

RECESSED LATCHING SYSTEM FOR AN OPTICAL CONNECTOR AND ADAPTER

CROSS-REFERENCE TO RELATED APPLICATION

This application is a National Stage Application of PCT/US2016/057717, filed on Oct. 19, 2016, which claims the benefit of U.S. Patent Application Ser. No. 62/245,111, filed on Oct. 22, 2015, the disclosures of which are incorporated herein by reference in their entireties. To the extent appropriate, a claim of priority is made to each of the above disclosed applications.

BACKGROUND

Optical adapters are used to optically couple together optical fiber tips of optical connectors. The optical adapters include an alignment structure that aligns the fiber tips to enable the transfer of optical signals therebetween. Optical connectors can be secured to the optical adapters when received at the ports of the optical adapters.

In certain examples, the optical connectors include ferrule-less optical connectors. For example, an example ferrule-less optical connector 300 known in the art is shown at FIG. 10. The optical connector 300 includes a connector body 322 having a front mating end 324 and a rear cable terminating end 326. An optical fiber extends forwardly through the connector body 322 and has a ferrule-less end portion that is accessible at the front mating end 324 of the connector body 322. The optical fiber is anchored adjacent the rear cable terminating end 326 against axial movement relative to the connector body 322. When two connectors 300 are coupled together, the end faces of the ferrule-less end portions abut one another, thereby causing the optical fibers to be forced rearwardly into the connector bodies 322 and to buckle/bend within fiber buckling regions of the connector bodies 322. A shutter 328 moves between closed and open positions. The shutter 328 protects the ferrule-less end portion of the optical fiber from contamination when shut and allows access to the ferrule-less end portion when open.

The connector 300 also includes a latch 330 that engages a catch of a fiber optic adapter. The latch 330 includes a resilient cantilever style latch. When the connectors 300 are inserted within the coaxially aligned ports of the adapter, the shutters 328 of the connectors 300 are retracted, thereby exposing the ferrule-less ends of the optical fibers. Continued insertion causes the ferrule-less ends to enter an optical fiber alignment device. In an example, the fiber alignment device includes funnels leading to a fiber alignment groove, and spring-biased balls pressing the fibers into the groove. Other examples of ferrule-less optical connectors and corresponding optical adapters can be found in U.S. patent application Ser. No. 14/377,189, filed Aug. 7, 2014, and titled "Optical Fiber Connection System Including Optical Fiber Alignment Device," the disclosure of which is incorporated herein by reference.

Improvements are desired.

SUMMARY

In accordance with some aspects of the disclosure, a fiber optic connector includes a connector plug body and a latch arm. A front end of the connector body is configured to provide access to an end of an optical fiber that extends through the connector body. The latch arm secures the connector plug body to a corresponding fiber optic adapter. The latch arm is connected to the plug body at a flexible pivot location that allows the latch arm to be pivoted relative to the connector plug body between a latching position and a release position. The latch arm includes a beam having an actuation portion that extends rearwardly from the flexible pivot location and a latching portion that extends forwardly from the flexible pivot location. The latching portion has a narrowed central portion that extends in a rear-to-front direction at least partially between the flexible pivot location and a latching end of the latching portion. The beam defines first and second lateral recesses on opposite first and second sides of the narrowed central portion. The latching end of the latch portion includes first and second catches positioned respectively at the first and second opposite sides of narrowed central portion. The first and second catches respectively include first and second rearwardly facing catch surfaces defining forward ends of the first and second lateral recesses.

In some implementations, a flange integral with the narrowed central portion overhangs the first and second lateral recesses. In an example, the narrowed central portion forms a web of the beam. The web and the flange cooperate to define a T-shaped transverse cross-sectional profile. In other implementations, the lateral recesses extend through a thickness of the beam so that no portion of the beam overhangs the lateral recesses.

In certain implementations, the latching end of the latching portion defines a forwardly facing ramp surface.

In certain implementations, the narrowed central portion is wider than a combined width of the first and second lateral recesses.

In certain implementations, the latching portion of the beam has a planar surface facing away from the connector plug body.

In certain implementations, ribs extend outwardly from the connector plug body. The ribs are spaced rearwardly from the front end of the connector plug body. In an example, the ribs are spaced forwardly of the lateral recesses in the latch arm. In an example, the ribs include two laterally spaced ribs connected by a rear web. In an example, each rib defines a forwardly facing ramp surface.

In accordance with other aspects of the disclosure, an optical adapter includes a body, an alignment structure disposed within the body, a platform extending between sidewalls of the body at a first port, and a latching arrangement disposed on the platform. The alignment structure is configured to align optical fibers of optical connectors received at the ports. The platform is recessed inwardly from the first end wall of the body so that the opposite sidewalls extend beyond the platform. The latching arrangement includes two latching members extending outwardly from the platform. Each of the latching members defines a ramped surface facing partially towards the first port and defining a shoulder facing towards the second port.

In certain implementations, the second latching member is spaced laterally along a width of the body from the first latching member.

In certain implementations, the first latching member abuts a first of the sidewalls and the second latching member abuts a second of the sidewalls.

In certain implementations, the platform has a bullnose end facing towards the first end of the body.

In certain implementations, the platform is recessed inwardly from the first end of the body.

In certain implementations, the body defines a second port at the second end, the first and second ports being aligned along an insertion axis.

In accordance with other aspects of the disclosure, a system for latching a fiber optic connector to a fiber optic adapter includes a fiber optic adapter; and a fiber optic connector. The fiber optic adapter includes an adapter body defining a port leading to an alignment structure. The optical adapter also defines a platform disposed at the first port. The platform is recessed inwardly from an outer periphery of the adapter body. The platform includes latching members that extend towards the outer periphery of the adapter body. The latching members have catch surfaces that face away from the first port. The fiber optic connector includes a connector plug body configured to hold an optical fiber. The connector plug body is sized and structured to be received at the port so that a tip of the optical fiber is received at the alignment structure. The fiber optic connector includes a latching arm having a latching end that deflects relative to the connector plug body. The latching end defines two rearwardly facing catch surfaces separated by a central webbing that extends along a length of the latching arm. The rearwardly facing catch surfaces are sized and positioned to align with the catch surfaces of the latching members when the fiber optic connector is received at the fiber optic adapter.

In certain implementations, the latching members also include ramped surfaces over which the latching end of the latching arm rides to deflect the latching end away from the connector plug body.

In certain implementations, the rearwardly facing catch surfaces of the latching end extend through a thickness of the latching end.

In accordance with other aspects of the disclosure, a fiber optic connector includes a connector plug body; and a latch arm for securing the connector plug body to a corresponding fiber optic adapter. A front end of the connector body is configured to provide access to an end of an optical fiber that extends through the connector body. The latch arm is connected to the plug body at a flexible pivot location that allows the latch arm to be pivoted relative to the connector plug body between a latching position and a release position. The latch arm includes a beam having an actuation portion that extends rearwardly from the flexible pivot location and a latching portion that extends forwardly from the flexible pivot location. The latching portion defines at least one catch surface that does not extend beyond a boundary of the beam.

In certain implementations, the catch surface partially bounds a lateral recess in the beam.

In some examples, the catch surface extends to an overhand that extends across the lateral recess. In other examples, the catch surface extends fully through a height of the beam.

In certain implementations, the catch surface partially bounds an aperture extending through a height of the beam.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure relates generally to a system for latching a fiber optic connector to a fiber optic adapter. The optical adapter includes positive latching members disposed on a recessed platform at a port. The fiber optic connector includes a latching arm having a latching end that deflects relative to the connector plug body. The latching end defines two rearwardly facing catch surfaces separated by a central webbing. The rearwardly facing catch surfaces are sized and positioned to align with the positive latching members when the fiber optic connector is received at the fiber optic adapter.

Figure 1:
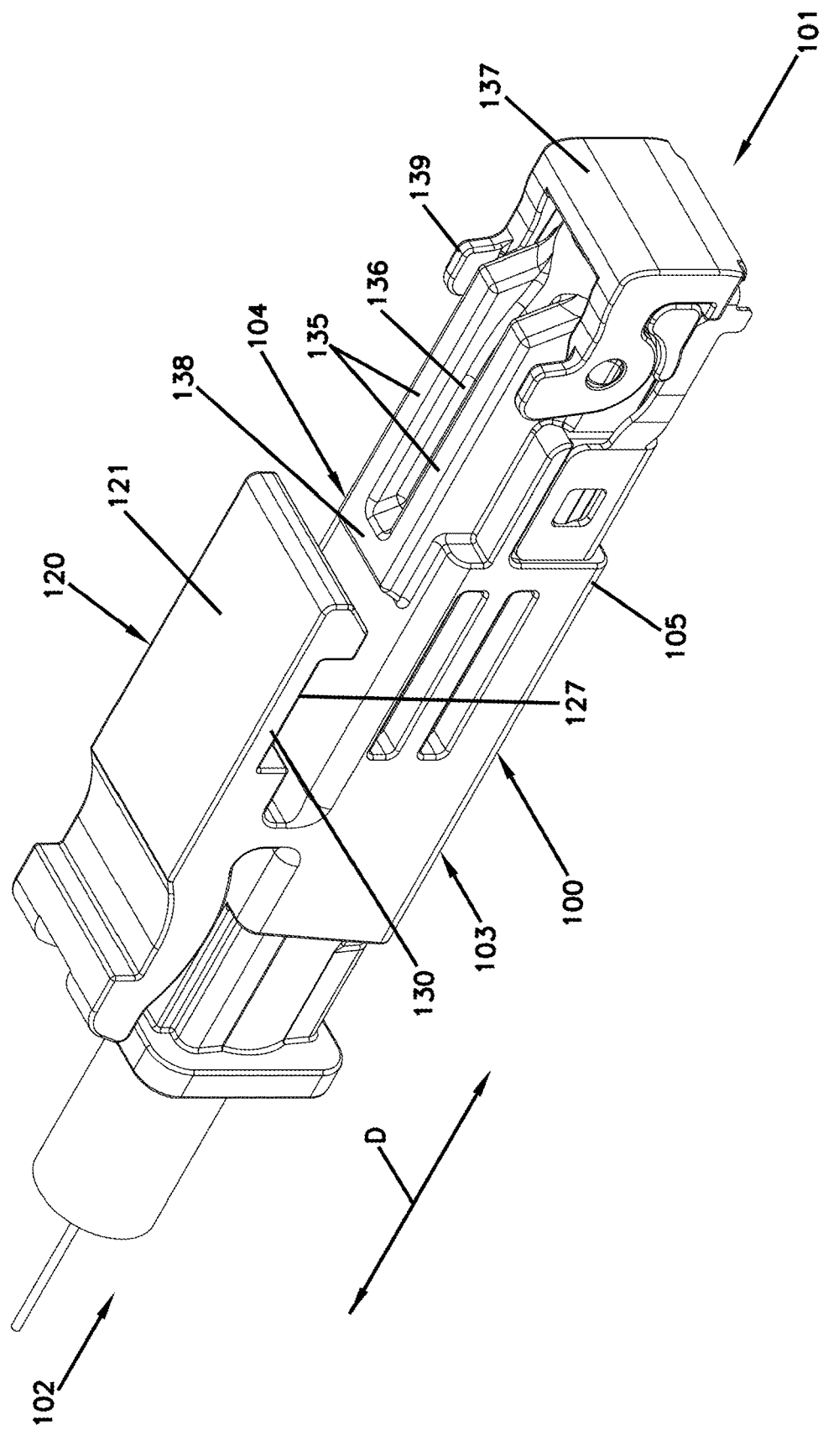
FIG. 1 is a first end perspective view of a first example optical connector configured in accordance with the principles of the present disclosure.
Figure 9:
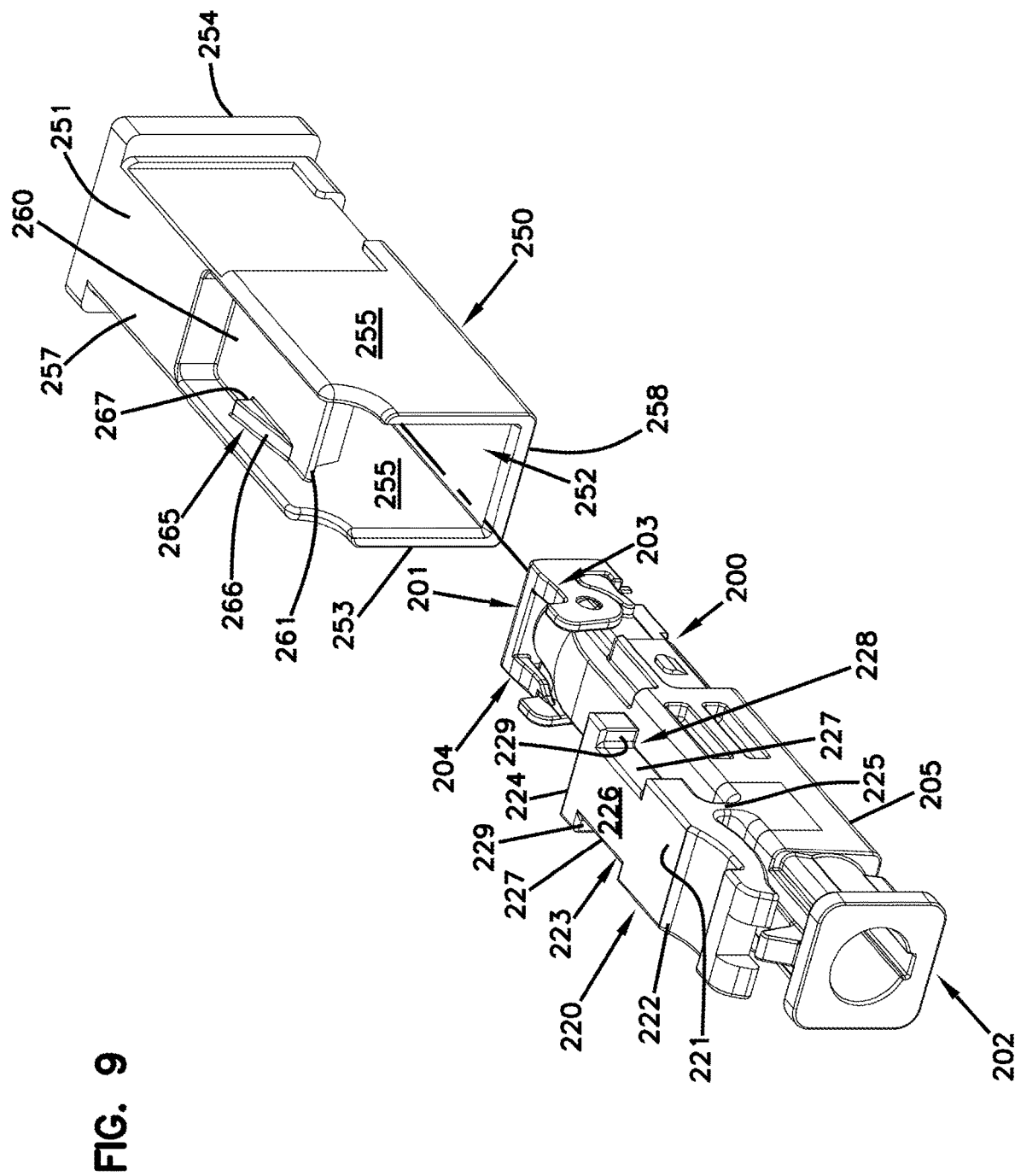
FIG. 9 shows a system including a second example optical connector aligned with a port of a second example optical adapter configured in accordance with the principles of the present disclosure.
Figure 10:
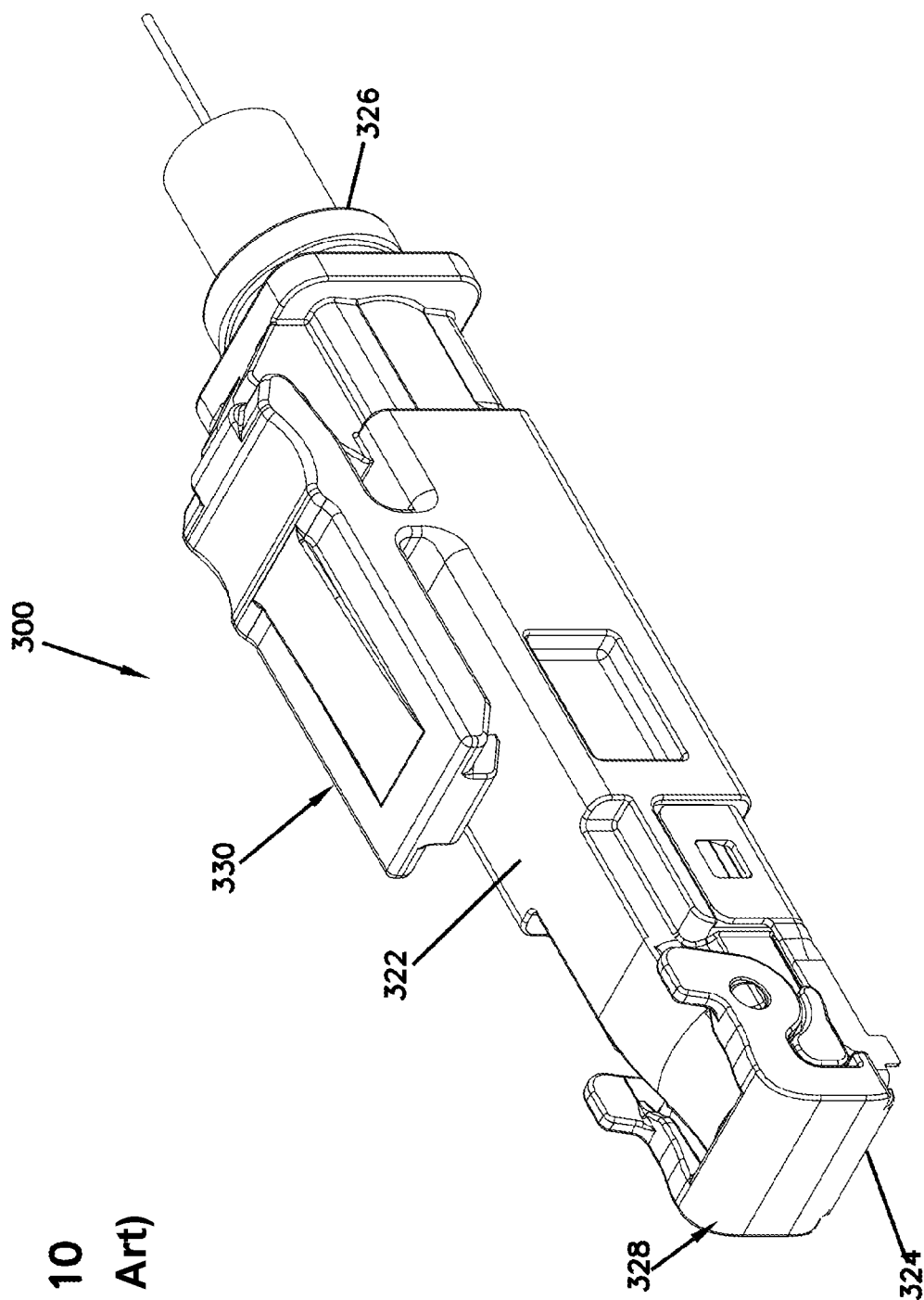
FIG. 10 is a perspective view of an example prior art ferrule-less optical connector.

FIGS. 1-3 and 9 illustrate example fiber optic connectors 100, 200 configured in accordance with the principles of the present disclosure. The fiber optic connectors 100, 200 each include a connector plug body 105, 205 and a latch arm 120, 220 for securing the connector plug body 105, 205 to a corresponding fiber optic adapter 150, 250 (FIGS. 6 and 9). The connector plug body 105, 205 includes a front end 101, 201 positioned opposite from a rear end 102, 202 (FIGS. 1 and 9). The front end 101, 201 of the connector body 105, 205 is configured to provide access to an end 109 of an optical fiber 108 that extends through the connector body 105, 205 (e.g., see FIG. 5).

Figure 7:
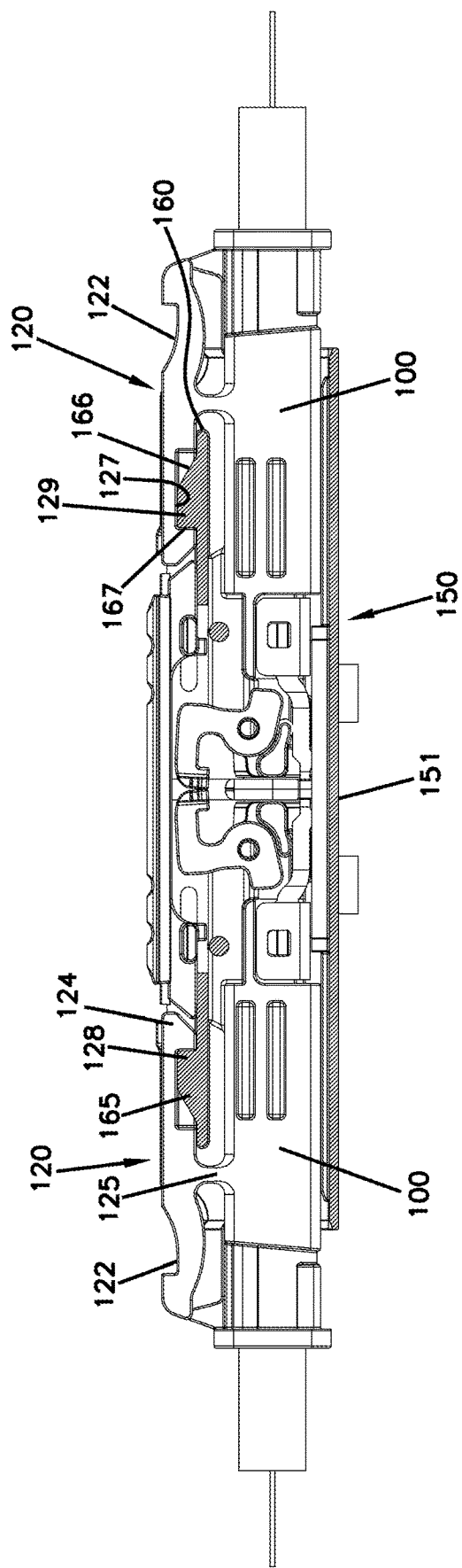
FIG. 7 is an axial cross-section taken along the 7-7 line of FIG. 6.

The latch arm 120, 220 is configured to secure the connector plug body 105, 205 to a corresponding fiber optic adapter 150, 250 (e.g., see FIGS. 7 and 9). The latch arm 120, 220 is connected to the plug body 105, 205 at a flexible pivot location 125, 225 that allows the latch arm 120, 220 to be pivoted relative to the connector plug body 105, 205 between a latching position and a release position. The latch arm 120, 220 includes a beam 121, 221 having an actuation portion 122, 222 that extends rearwardly from the flexible pivot location 125, 225 and a latching portion 123, 223 that extends forwardly from the flexible pivot location 125, 225.

The latching portion 123, 223 deflects along a pivot path P (FIG. 3) when the latch arm 120, 220 is pivoted between the latching position and the release position. In certain examples, deflecting the actuation portion 122, 222 causes deflection of the latching portion 123, 223 along the pivot path P. In certain examples, the latching portion 123, 223 deflects in a different direction from the actuation portion 122, 222. In an example, the latching portion 123, 223 deflects in an opposite direction from the actuation portion 122, 222.

Figure 2:
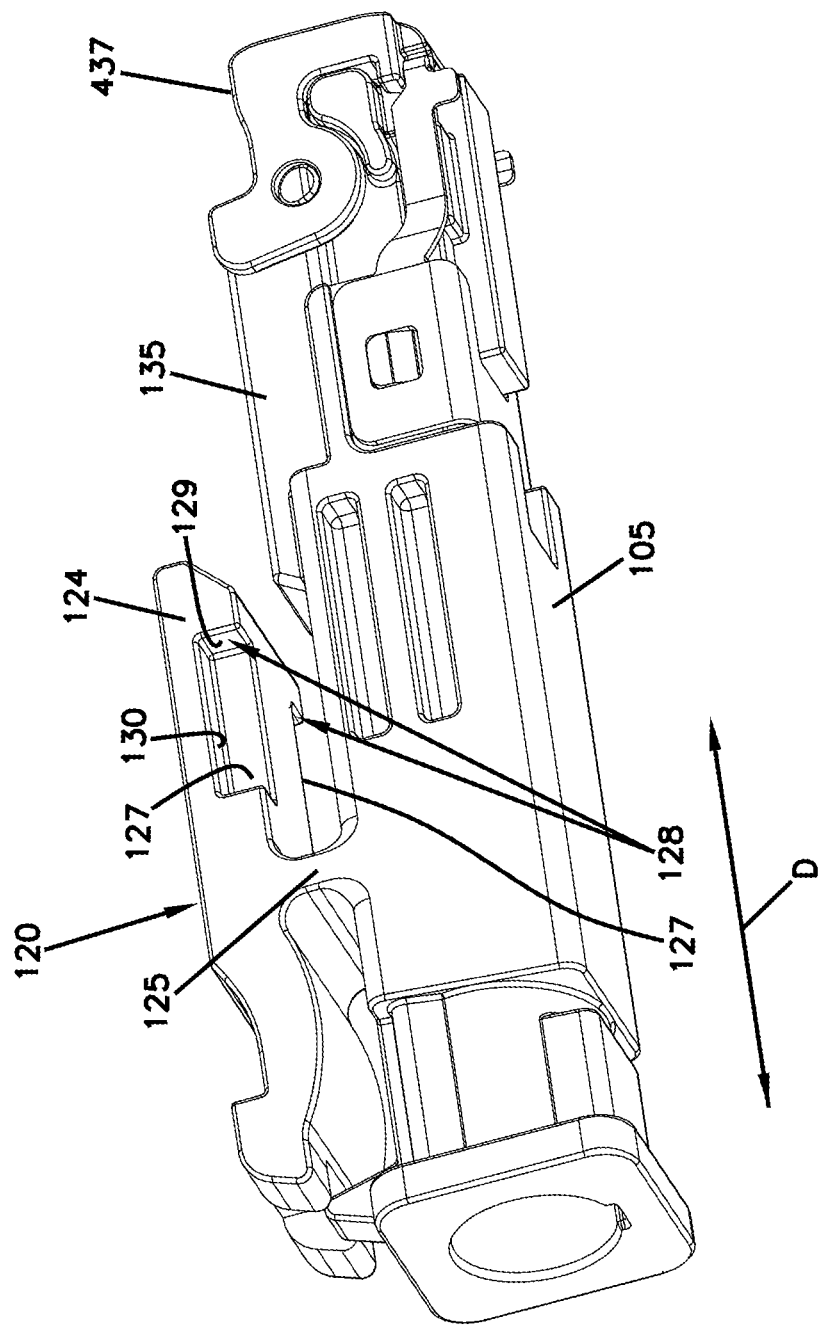
FIG. 2 is a second end perspective view of the optical connector of FIG. 1.

The latching portion 123, 223 has a narrowed central portion 126, 226 that extends in a rear-to-front direction D at least partially between the flexible pivot location 125, 225 and a latching end 124, 224 of the latching portion 123, 223 (see FIG. 2). The beam 121, 221 defines first and second lateral recesses 127, 227 on opposite first and second sides 103, 104, 203, 204 of the narrowed central portion 126, 226 (FIGS. 2 and 9). The latching end 124, 224 of the latching portion 123, 223 includes first and second catches 128, 228 positioned respectively at the first and second opposite sides 103, 104, 203, 204 of narrowed central portion 126, 226 (FIGS. 2 and 9). The first and second catches 128, 228 respectively include first and second rearwardly facing catch surfaces 129, 229, which define forward ends of the first and second lateral recesses 127, 227 (FIGS. 2 and 9).

Figure 3:
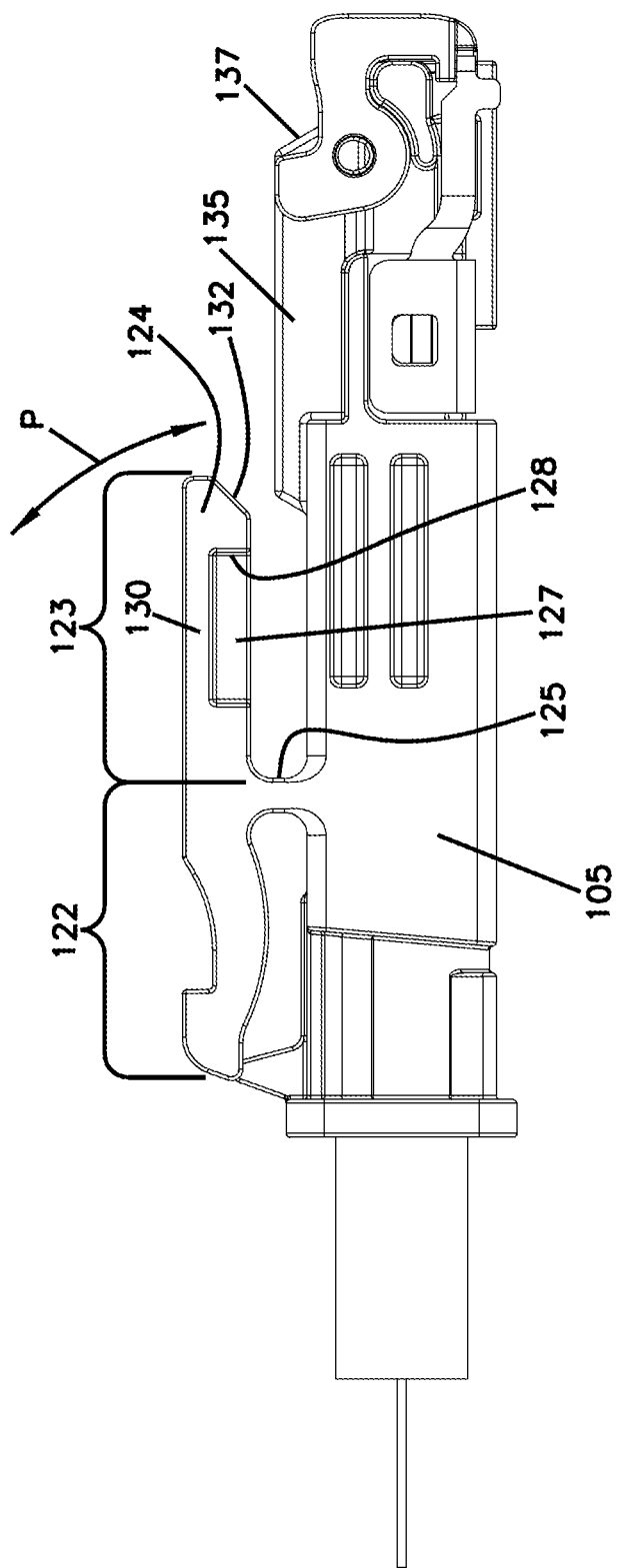
FIG. 3 is a side elevational view of the optical connector of FIG. 1.

In some implementations, a flange 130 overhangs the first and second lateral recesses 127 of the fiber optic connector 100 (e.g., see FIGS. 1-3). In certain implementations, the flange 130 is integral with the narrowed central portion 126. In an example, the flange 130 and the narrowed central portion 126 are integral with the beam 121. In certain examples, the narrowed central portion 126 forms a web of the beam 121. The web and the flange 130 cooperate to define a T-shaped transverse cross-sectional profile of the beam 121 at the lateral recesses 127. In other implementations, no portion of the beam 221 overhangs the lateral recesses 227 of the fiber optic connector 200 (e.g., see FIG. 9).

In some implementations, the latching end 124 of the latching portion 123 defines a forwardly facing ramp surface 132 (FIG. 3). In other examples, the latching end 224 may have a squared-off end. In the depicted examples, the latching arm 120 of the fiber optic connector 100 has a forwardly facing ramp surface 132 and the latching arm 220 of the fiber optic connector 200 does not have a forwardly facing ramp surface 132 and the latching arm 220. In other examples, however, each of the latching arms 120, 220 may have a squared-off end, a ramped end, a contoured end, or any other shaped end.

In some implementations, the fiber optic connector 100 includes a plurality of ribs 135 that extend outwardly from the plug connector body 105. In certain implementations, the ribs 135 provide extra strength to the fiber optic connector body 100. In certain implementations, the ribs 135 inhibit manual opening of a shutter 137 by the user. The shutter 137 pivots open and shut relative to the connector body 105 to expose and cover, respectively, the optical fiber tip when tabs 139 of the shutter 137 are deflected. In use, the tabs 139 are deflected by lugs within the adapter 150, 250. The ribs 135 inhibit finger access to the shutter tabs 139 to hinder opening of the shutter 137 outside of the adapter 150, 250 (e.g., accidental opening, unauthorized opening, etc.).

In the example shown, two laterally spaced ribs 135 extend upwardly from the plug connector body 105. In other examples, the connector plug body 105 can have a greater or lesser number of ribs 135. A gap 136 is provided between the ribs 135. In certain examples, front ends of the ribs 135 are ramped or tapered. In certain examples, rear ends of the ribs 135 are connected by a webbing 138.

Figure 4:
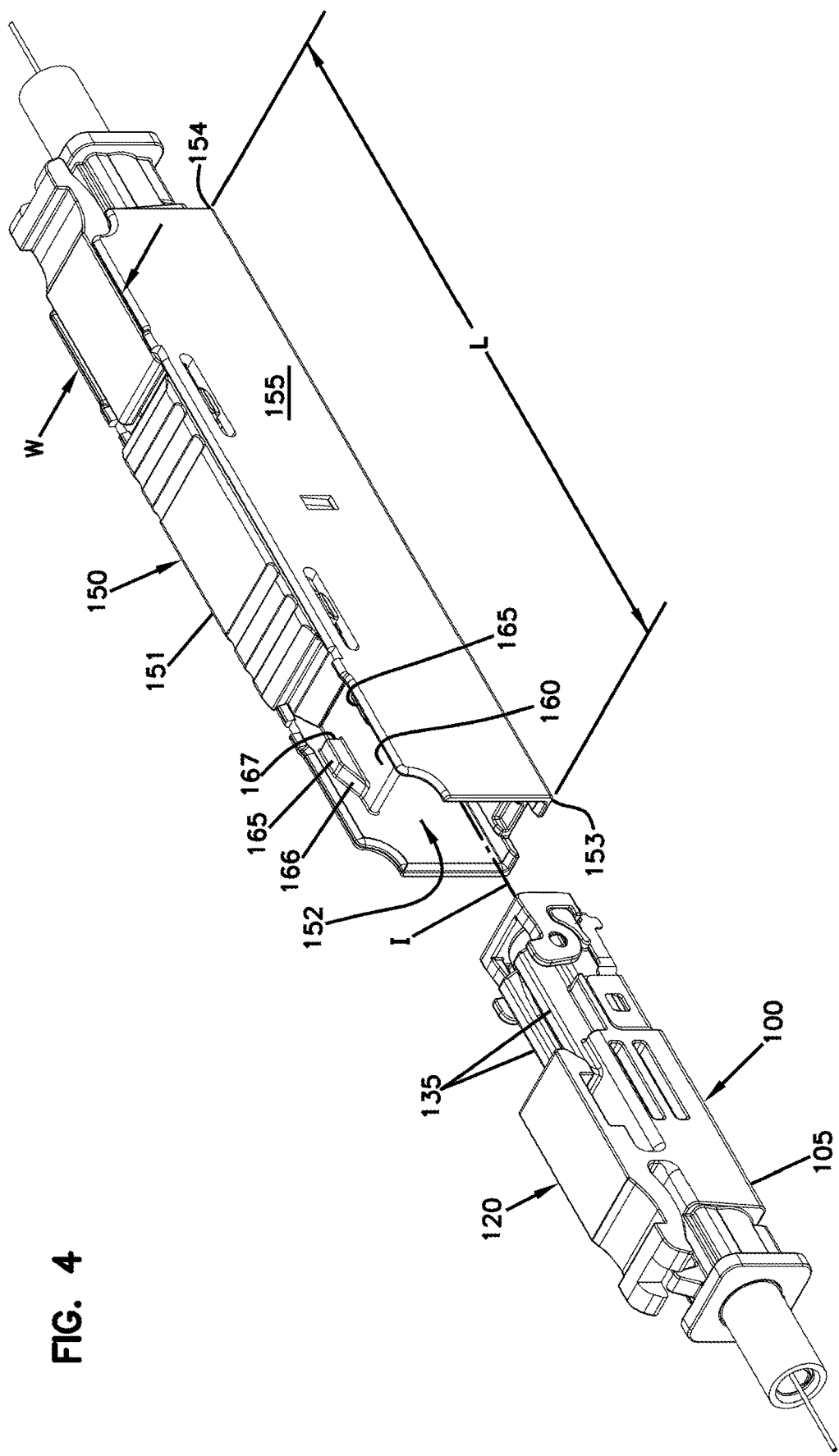
FIG. 4 shows a system including the optical connector of FIG. 1 aligned with a port of an example optical adapter configured in accordance with the principles of the present disclosure.
Figure 5:
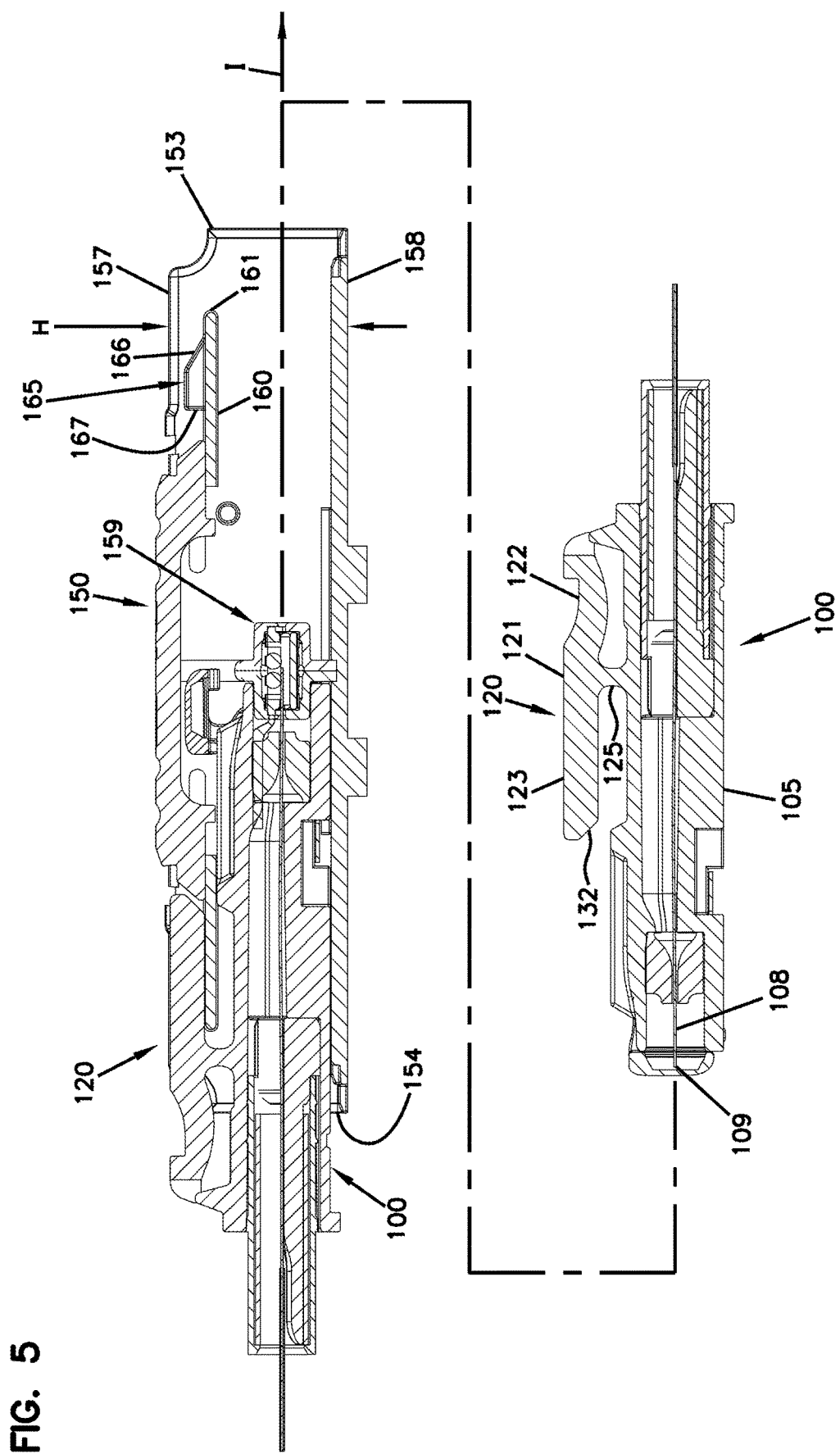
FIG. 5 is an axial cross-section of the system of FIG. 4 with the optical connector of FIG. 4 exploded away from the optical adapter of FIG. 4.
Figure 6:
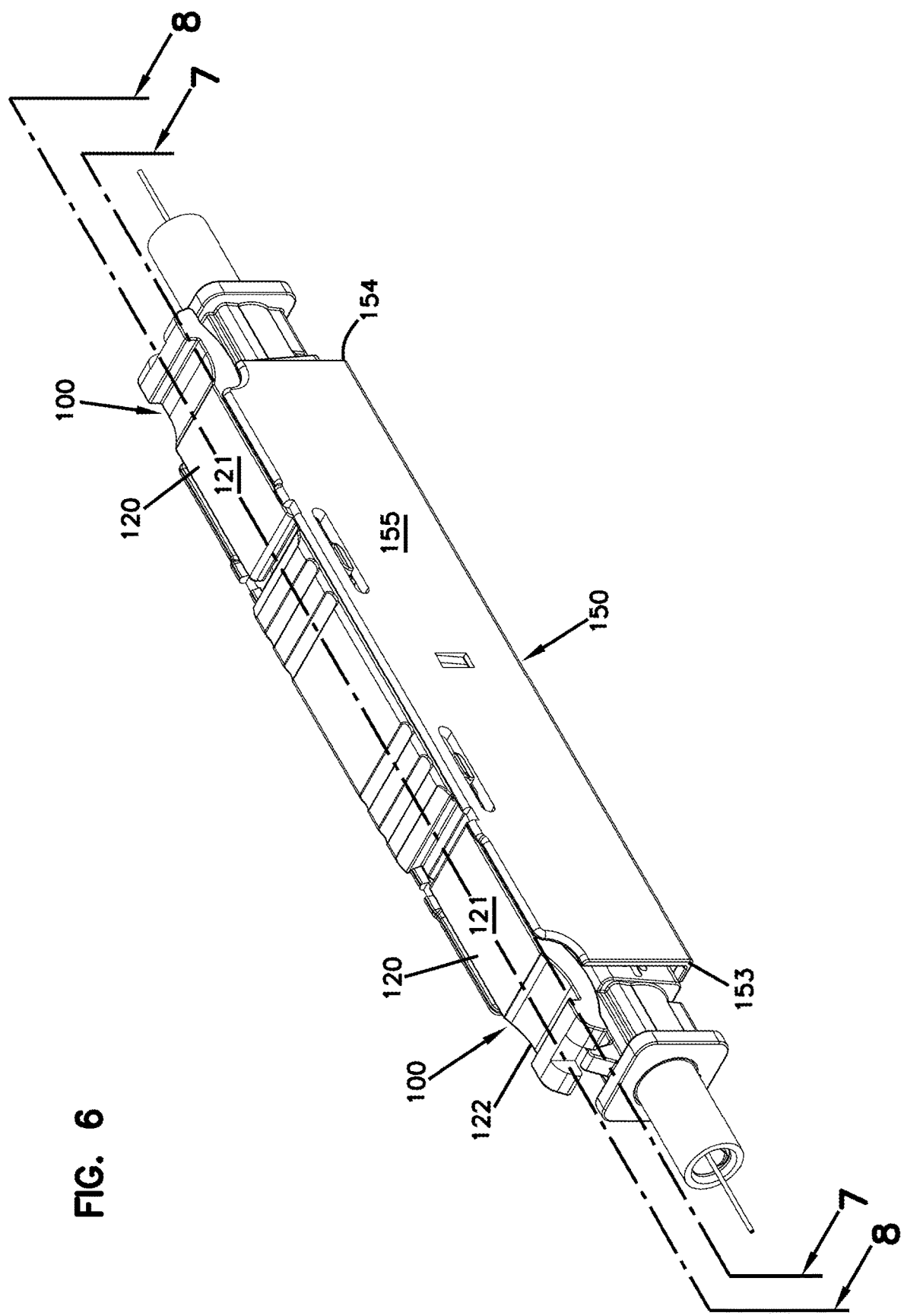
FIG. 6 shows the system of FIG. 4 with the optical connector received at the optical adapter.

FIGS. 4, 5, and 9 depict the fiber optic connector 100, 200 aligned with a first port 152, 252 of an example optical adapter 150, 250. A body 151, 251 of the optical adapter 150, 250 includes opposite sidewalls 155, 255 extending along a height H of the body 151, 251 between opposite end walls 157, 158, 257, 258. The sidewalls 155, 255 also extend along a length L of the body 151, 251 between a first end 153, 253 and a second end 154, 254. The body 151, 251 defines a first port 152, 252 at the first end 153, 253. In certain examples, the body 151, 251 defines a second port 152, 252 at the second end 154, 254 that is aligned with the first port 152, 252 along an insertion axis I. In certain examples, the body 151, 251 can define a greater number of ports 152, 252.

An alignment structure 159 is disposed within the body 151, 251 (FIG. 5). The alignment structure 159 is configured to align optical fibers 108 of optical connectors 100, 200 received at the ports 152, 252. A platform 160, 260 extends between the sidewalls 155, 255 of the body 151, 251 at the first port 152, 252. The platform 160, 260 is recessed inwardly from the first end wall 157, 257 of the body 151, 251 so that the opposite sidewalls 155, 255 extend from the second end wall 158, 258, beyond the platform 160, 260, to the first end wall 157, 257 (see FIGS. 5 and 9). In certain examples, the platforms 160, 260 also are recessed inwardly from the respective ends 153, 154, 253, 254 of the optical adapter bodies 151, 251 (see FIGS. 5 and 9). In some implementations, the platform 160, 260 has a bullnose-shaped end 161, 261. In other examples, the platform 160, 260 can have a flat, rounded, beveled, or otherwise contoured end 161, 261.

A latching arrangement is disposed at the platform 160, 260. The latching arrangement includes two latching members 165, 265 extending outwardly from the platform 160, 260 towards the first end wall 157, 257. Each of the latching members 165, 265 defines a ramped surface 166, 266 facing partially towards the first port 152, 252 and defining a shoulder 167, 267 facing away from the first port 152, 252. In some examples, the latching members 165 include a flat surface transitions between the ramped surface 166 and the shoulder 167 (see FIG. 7). In other examples, the ramped surfaces 266 of the latching members 265 extend to the shoulders 267.

Figure 8:
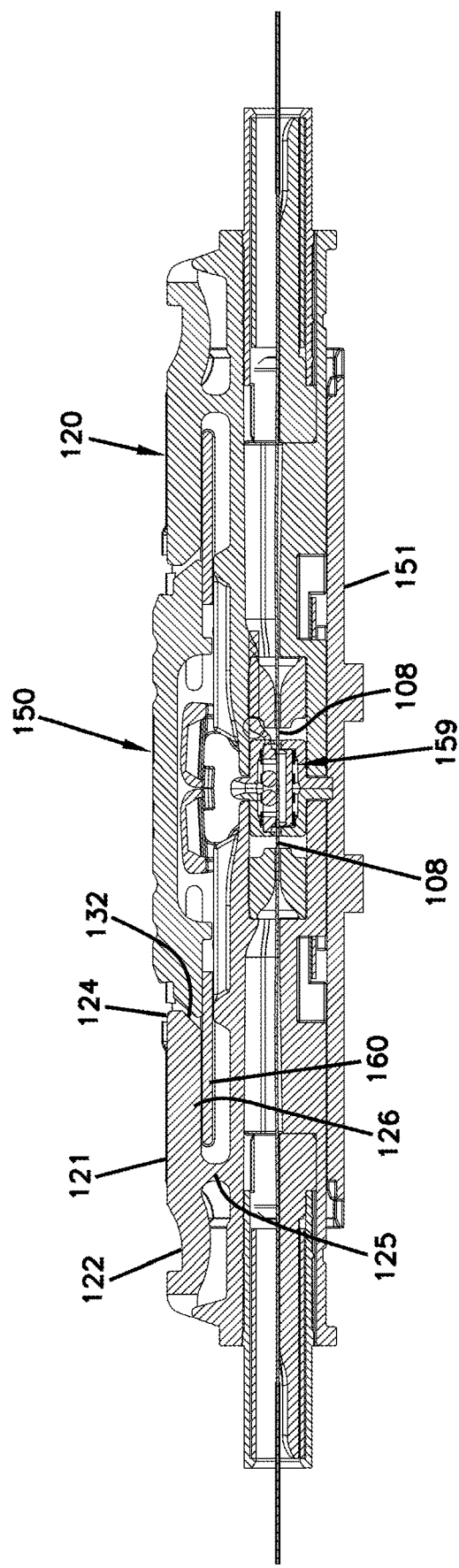
FIG. 8 is an axial cross-section taken along the 8-8 line of FIG. 6.

In certain implementations, the latching members 165, 265 are laterally spaced along the width W of the body 151, 251. For example, the latching member 165, 265 can be spaced sufficient to enable the narrowed central portion 126 of the latching arm 120, 220 to seat between the latching members 165, 265 when the connector 100, 200 is received at the adapter port 152, 252 (see FIG. 8). In certain examples, the first latching member 165, 265 abuts a first of the sidewalls 155, 255 and the second latching member 165, 265 abuts a second of the sidewalls 155, 255 (see FIGS. 5 and 9).

In use, a fiber optic connector 100, 200 is inserted into the first port 152, 252 of the optical adapter 150, 250 by sliding the first end 101, 201 of the connector plug body 105, 205 into the first port 152, 252. The latching end 124, 224 of the latching arm 120, 220 slides over the platform 160, 260 at the first port 152, 252. The latching end 124, 224 of a connector 100, 200 rides over the ramped surfaces 166, 266 of the latching members 165, 265 as the fiber optic connector 100, 200 is slid into the port 152, 252. Riding over the ramped surfaces 166, 266 causes the latching portion 123, 223 of the latching arm 120, 220 to deflect to the release position. When the latching end 124, 224 clears the latching members 165, 265, the latching end 124, 224 snaps over the latching member 165, 265 and deflects to the latching position. The catch surfaces 129, 229 of the latching end 124, 224 abut the shoulders 167, 267 of the latching members 165, 265 (see FIG. 7).

In certain implementations, the catch surfaces 129, 229 are biased against the shoulders 167, 267 of the latching members 165, 265. In some implementations, buckling of the terminated optical fiber provides sufficient resilient force to bias the catch surfaces 129, 229 against the shoulders 167, 267. In other implementations, a resilient member (e.g., a seal such as an O-ring) can be provided within the adapter 150, 250 to bias the connector 100, 200 outwardly.

Figure 11:
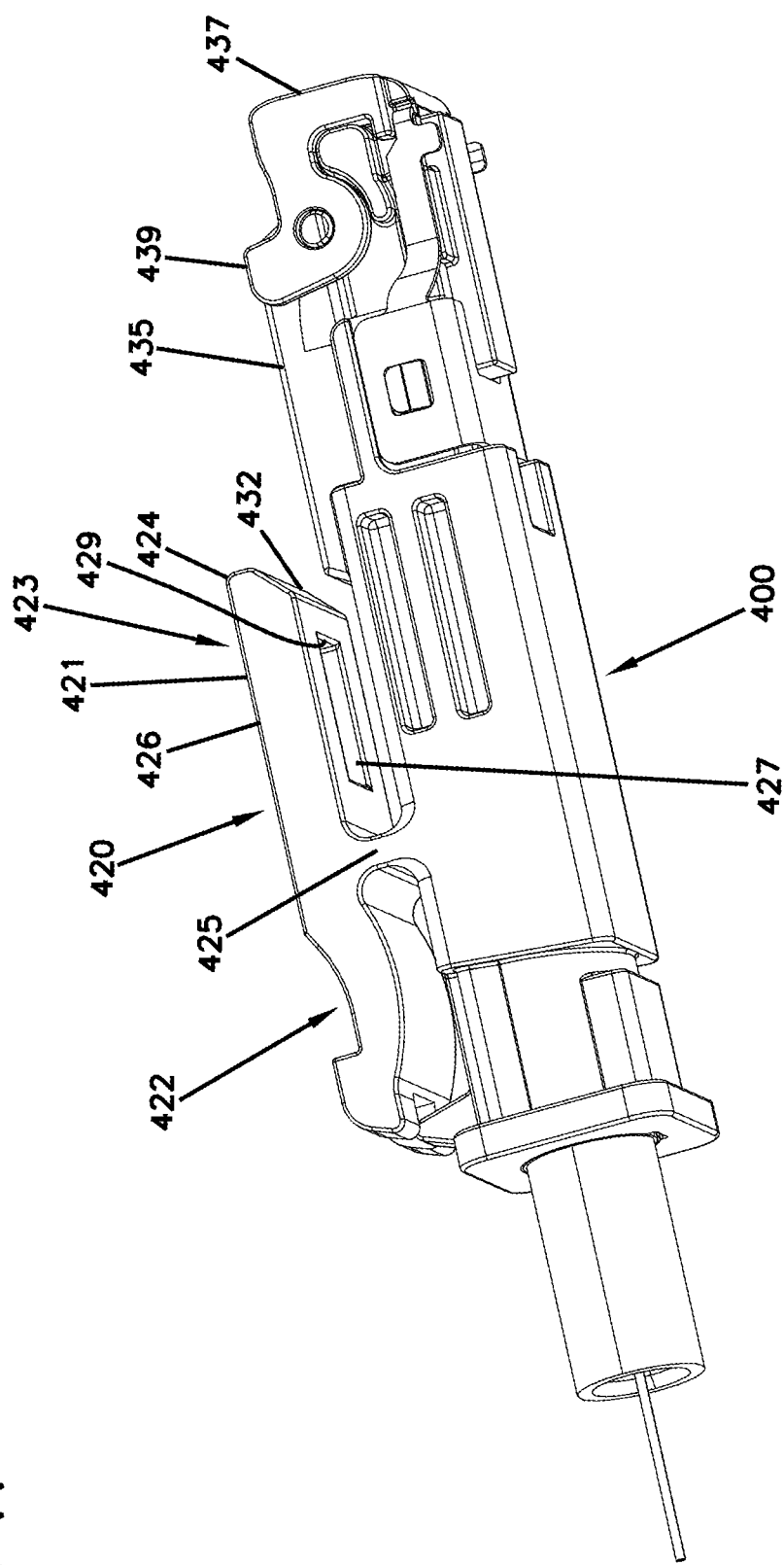
FIG. 11 is a perspective view of another example fiber optic connector configured in accordance with the principles of the present disclosure.
Figure 12:
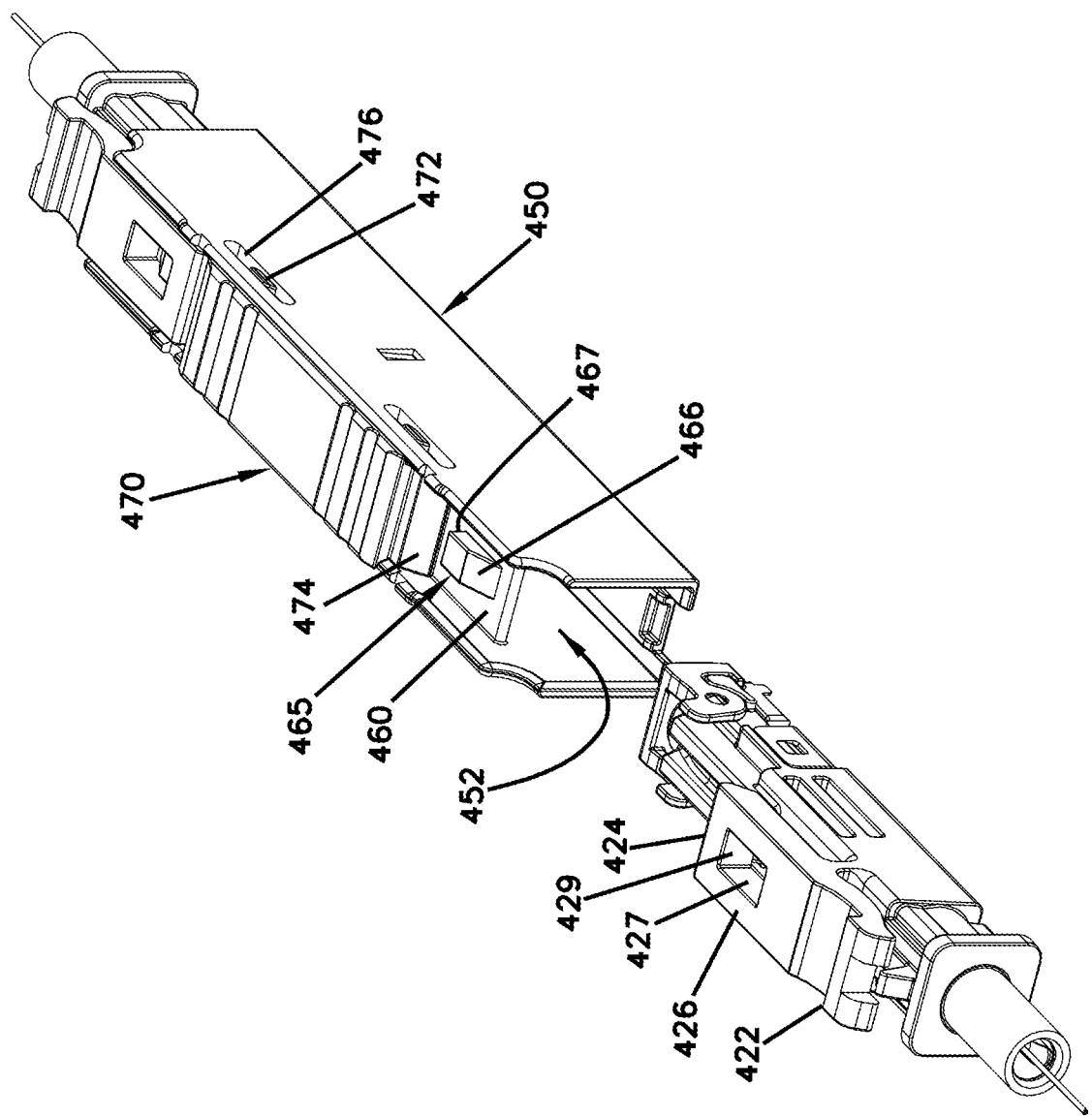
FIG. 12 is a perspective view of the fiber optic connector of FIG. 11 aligned with a port of an example optical adapter configured in accordance with the principles of the present disclosure.
Figure 13:
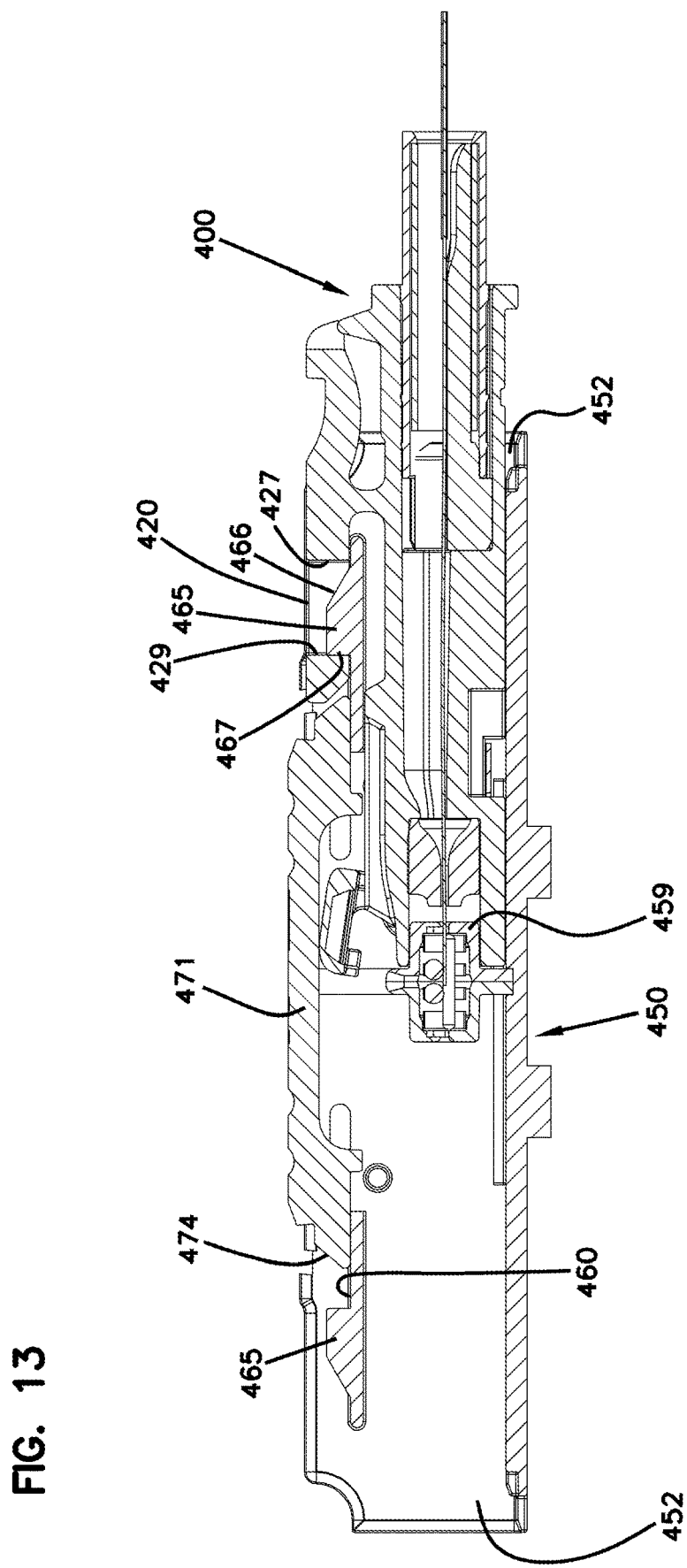
FIG. 13 is a cross-sectional view of the fiber optic connector and optical adapter of FIG. 12 latched together.

FIGS. 11-13 illustrate another example fiber optic connector 400 including a latch arm 420. The latch arm 420 includes a beam 421 having an actuation portion 422 that extends rearwardly from a flexible pivot location 425 and a latching portion 423 that extends forwardly from the flexible pivot location 425. The latching portion 423 deflects along a pivot path when the latch arm 420 is pivoted between the latching position and the release position. The latching portion 423 has a central portion 426 that extends in a rear-to-front direction at least partially between the flexible pivot location 425 and a latching end 424 of the latching portion 423. The beam 421 defines an aperture 427 through the central portion 426 (FIGS. 11-12). The aperture 427 is partially bounded by a catch surface 429.

In some implementations, the fiber optic connector 400 includes a plurality of ribs 435. In certain implementations, the ribs 435 provide extra strength to the fiber optic connector body 400. In certain implementations, the ribs 435 inhibit manual opening of a shutter 437 by the user. For example, the ribs 435 may inhibit finger access to shutter tabs 439 to hinder opening of the shutter 437 outside of the adapter 150, 250, 450 (e.g., accidental opening, unauthorized opening, etc.). In certain implementations, the ribs 435 are the same as ribs 135 as described above with respect to fiber optic connector 100.

FIG. 12 depicts the fiber optic connector 400 aligned with a first port 452 of an example optical adapter 450. The adapter 450 defines a second port 452 at the second end 154, 254 that is aligned with the first port 152, 252 along an insertion axis I. In certain examples, the body 151, 251 can define a greater number of ports 152, 252. An alignment structure 459 is disposed within the body adapter 450 (FIG. 13). A platform 460 extends between sidewalls of the adapter 450 at the first port 452. The platform 460 is recessed inwardly from an outer periphery of the adapter 450. A latching arrangement is disposed at the platform 460. The latching arrangement includes a latching member 465 extending outwardly from the platform 460. The latching member 465 defines a ramped surface 466 facing partially towards the first port 452 and a shoulder 467 facing away from the first port 452.

In use, a fiber optic connector 400 is inserted into the first port 452 of the optical adapter 450. The latching end 424 of the latching arm 420 slides over the platform 460 and rides over the ramped surface 466 of the latching member 465. Riding over the ramped surfaces 466 causes the latching portion 423 of the latching arm 420 to deflect to the release position. When the latching end 424 clears the latching member 465, the latching end 424 snaps over the latching member 465 and deflects to the latching position. The catch surfaces 429 of the latching end 424 abut the shoulders 467 of the latching members 465 (see FIG. 13).

Referring to the figures in general, in certain implementations, the adapter 150, 250, 450 includes a latch release 170, 470 (e.g., see FIGS. 4, 5, and 12) that mechanically releases the latching arms 120, 220, 420 from the latching members 165, 265, 465. In some implementations, the latch release 170, 470 is disposed at an intermediate position between the first and second ports 152, 252, 452. The latch release 170, 470 can unlatch a connector 100, 200, 400 from either port 152, 252, 452. For example, the latch release 170, 470 can release the latching arm 120, 220, 420 by sliding towards the latching arm 120, 220, 420 and flexing the latching arm 120, 220, 420 upwardly away from the latching member 165, 265, 465.

In the example shown, the latch release 170, 470 includes a body 171, 471 that extends along a length of the adapter 150, 250, 450. The latch release body 171, 471 includes flanges 172, 472 that extend outwardly from the body 171, 472. The adapter 150, 250, 450 defines slots 176, 476 through which the flanges 172, 472 extend and along which the flanges 172, 472 are slidable, thereby allowing the latch release 170, 470 to slide relative to the adapter 150, 250, 450. At least one end of the latch release body 171, 471 defines a ramped surface 174, 474. In certain examples, opposite ends of the latch release body 171, 471 define ramped surfaces 174, 474. Each ramped surface 174, 474 is configured to oppose the forwardly facing ramp surface 132, 432 of the latch arm 120, 420. When the latch release body 171, 471 is slid towards a latched connector 100, 400 the respective ramped surface 174, 474 engages the forwardly facing ramp surface 132, 432 of the latch arm 120, 420 of the connector 100, 400, thereby deflecting the actuation portion 122, 422 of the latch arm 120, 420 to the release position.

One example problem with the connector 300 is that pulling on the connector 300 while the connector 300 is latched to the adapter 250 may cause the latch 330 to stretch and deform. The stretching/deformation may enable axial movement of the connector 300 and hence of the optical fiber held by the connector 300. Such axial movement of the fiber may degrade the optical signal. In certain examples, the fiber optic connectors 100, 200, 400 are designed to inhibit stretching and deformation of the latching arms 120, 220, 420 if pulled on while engaged at an adapter.

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:
1. A fiber optic connector comprising:
  a connector plug body including a front end positioned opposite from a rear end, wherein the front end of the connector plug body is configured to provide access to an end of an optical fiber that extends through the connector plug body; and
  a latch arm for securing the connector plug body to a corresponding fiber optic adapter, the latch arm being connected to the connector plug body at a flexible pivot location that allows the latch arm to be pivoted relative to the connector plug body between a latching position and a release position, the latch arm including a beam having an actuation portion that extends rearwardly from the flexible pivot location and a latching portion that extends forwardly from the flexible pivot location, the latching portion defining a plurality of catch surfaces that are recessed within the latching portion of the beam and facing towards the rear end of the plug connector body.

2. The fiber optic connector of claim 1, wherein each catch surface partially bounds a lateral recess in the beam.

3. The fiber optic connector of claim 2, wherein each catch surface extends to an overhang that extends across the lateral recess.

4. The fiber optic connector of claim 2, wherein each catch surface extends fully through a height of the beam.

5. The fiber optic connector of claim 1, wherein the latching portion deflects along a pivot path when the latch arm is pivoted between the latching position and the release position.

6. The fiber optic connector of claim 1, wherein the connector plug body is ferrule-less.

7. The fiber optic connector of claim 1, further comprising a shutter mounted to the front end of the connector plug body, the shutter being movable between an open position and a closed position.

8. The fiber optic connector of claim 1, wherein the connector plug body includes ribs that inhibit manual opening of the shutter by a user.

9. The fiber optic connector of claim 1, wherein the latching portion of the beam has a height, a length, and a width, and wherein each catch surface does not extend beyond the height of the latching portion, does not extend beyond the length of the latching portion, and does not extend beyond the width of the latching portion.

10. The fiber optic connector of claim 1, wherein
the latching portion has a narrowed central portion that extends in a rear-to-front direction at least partially between the flexible pivot location and a latching end of the latching portion, the beam defining first and second lateral recesses on opposite first and second sides of the narrowed central portion, the latching end of the latching portion including first and second catches positioned respectively at the first and second opposite sides of the narrowed central portion, the first and second catches respectively including first and second rearwardly facing catch surfaces defining forward ends of the first and second lateral recesses.

11. The fiber optic connector of claim 10, further comprising a flange integral with the narrowed central portion that overhangs the first and second lateral recesses.

12. The fiber optic connector of claim 11, wherein the narrowed central portion forms a web of the beam, and wherein the web and the flange cooperate to define a T-shaped transverse cross-sectional profile.

13. The fiber optic plug connector of claim 11, wherein the first and second lateral recesses extend through a thickness of the beam so that no portion of the beam overhangs the lateral recesses.

14. The fiber optic connector of claim 10, wherein the latching end of the latching portion defines a forwardly facing ramp surface.

15. The fiber optic connector of claim 10, wherein the narrowed central portion is wider than a combined width of the first and second lateral recesses.

16. The fiber optic connector of claim 10, wherein the latching portion of the beam has a planar surface facing away from the connector plug body.

17. The fiber optic connector of claim 10, further comprising a plurality of ribs extending outwardly from the connector plug body, the plurality of ribs being spaced rearwardly from the front end of the connector plug body.

18. The fiber optic connector of claim 17, wherein the plurality of ribs is spaced forwardly of the first and second lateral recesses in the latch arm.

19. The fiber optic connector of claim 17, wherein the plurality of ribs includes two laterally spaced ribs connected by a rear web.

20. The fiber optic connector of claim 18, wherein each rib defines a forwardly facing ramp surface.

21. A fiber optic connector comprising:
a connector plug body extending along a longitudinal axis between a front end and a rear end, wherein the front end of the connector plug body is configured to provide access to an end of an optical fiber that extends through the connector plug body; and
a latch arm for securing the connector plug body to a corresponding fiber optic adapter, the latch arm being connected to the connector plug body at a flexible pivot location that allows the latch arm to be pivoted relative to the connector plug body between a latching position and a release position, the latch arm including a beam having an actuation portion that extends rearwardly from the flexible pivot location and a latching portion that extends forwardly from the flexible pivot location, the latching portion having a series of transverse cross-sectional profiles each extending along a respective reference plane that is transverse to the longitudinal axis of the connector plug body, the latching portion defining first and second catch surfaces that face towards the rear end of the connector plug body and that do not extend beyond a peripheral boundary of any of the transverse cross-section profiles of the latching portion of the beam.

* * * * *